July 28, 1964  A. N. IKNAYAN ETAL  3,142,328
TIRE INFLATION TOOL
Filed June 28, 1962

INVENTORS
ALFRED N. IKNAYAN
THOMAS O. HALE
BY
*Harvey E Bumgardner Jr.*
ATTORNEY United States Patent Office 3,142,328
Patented July 28, 1964

3,142,328
TIRE INFLATION TOOL
Alfred N. Iknayan and Thomas O. Hale, Indianapolis, Ind., assignors to United States Rubber Company, New York, N.Y., a corporation of New Jersey
Filed June 28, 1962, Ser. No. 206,085
9 Claims. (Cl. 152—429)

This invention relates to tire inflation tools and, more particularly, to a new and improved tool for inflating the inner tube in a tire with pressurized air while simultaneously maintaining the valve stem of said inner tube in proper alignment and position with respect to the valve hole in the wheel rim. The invention is particularly useful at the present time for mounting bicycle tires provided with inner tubes, but would be useful also with other types of tubed tires and other objects having similar separate inflatable linings and valves.

The usual procedure currently in use for mounting bicycle tires and inner tubes begins with inserting the inner tube in the casing. Next, the casing is mounted on the wheel rim and the valve stem of the inner tube is manually pulled through the valve hole in the rim. The valve stem is then tilted and jammed or cocked against the edge of the valve hole in the rim in order to secure the valve against the thrust of the inflating air chuck. Then the air chuck is applied to the valve stem and the tube is inflated.

The method outlined above frequently results in cocked valve stems which do not recenter themselves when the inflation chuck is removed. Also, the cocked valve base may permit a fold of rubber to form under the edge of the base and adjacent to the rim during inflation. As internal pressure builds up in the tube, the valve base is flattened onto this fold of thinned or overstretched tube wall to create a chafe susceptible area.

Accordingly, an object of this invention is to provide a simple mechanism, in combination with a conventional air chuck, which will center the valve stem in the valve hole and continue to maintain proper valve positioning action without cocking of the valve stem while the inner tube is being inflated.

A further object of this invention is to provide a tire inflation tool which will combine the functions of aligning and positioning the valve and of inflating the tube in one simple operation.

Other objects and advantages of the present invention will become apparent from the following description when read in conjunction with the accompanying drawings wherein.

Figure 1:
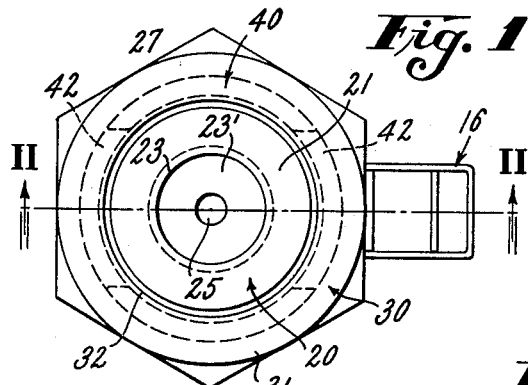
FIG. 1 is an enlarged plan view of the device of this invention from the end thereof intended to be connected to the pressurized air conduit.
Figure 2:
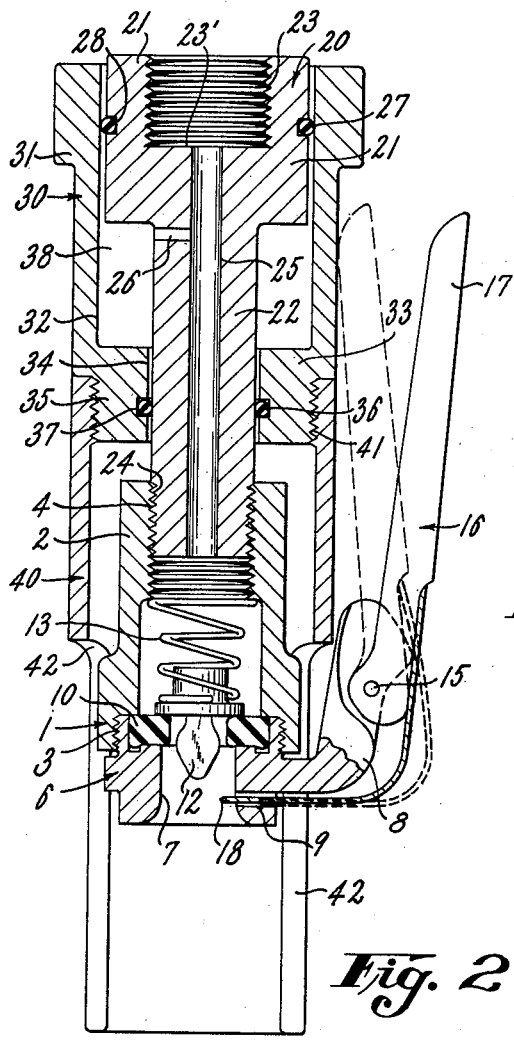
FIG. 2 is a sectional view taken along line II—II of FIG. 1, the dotted portions showing the position of the clamping lever at the time of mounting the device on a valve stem.

Referring now to the drawings and particularly to FIG. 2, the numeral 1 denotes a conventional air chuck similar to that disclosed in United States Patent No. 1,902,919 to Talbot. The chuck 1 is comprised of a tubular body 2 provided with a threaded recess 3 in its "forward" or working end and a threaded bore 4 in its "rear" or attachment end. Threaded into the recess 3 is a collar 6 provided with a central valve stem receiving hole 7 and a lateral extension 8 of the general shape shown in the drawing projecting from one side thereof. A lateral slot 9 extends through the collar 6 parallel and adjacent to the extension 8 from the hole 7 to the outer surface of the collar 6. Seated between the bottom of the recess 3 and the collar 6 is a gasket 10 which serves the dual function of providing a tightly seated, sealed connection between the collar 6 and the body 2 and of providing a seat for the valve core depressor 12 which is mounted inside the tubular body 2 and is seated against the gasket 10 by the spring 13.

Mounted on the lateral extension 8 of the collar 6 by means of a pin 15 is a clamping lever 16 having a handle portion 17 and a clamping jaw 18. As shown in the drawing, the lever 16 is so formed and slotted that, when the handle 17 is depressed toward the body 2, the jaw 18, that is inserted through the slot 9 in the collar 6 and normally extends far enough into the hole 7 to grip any valve stem inserted therein, will be withdrawn from the hole 7 into the slot 9, thus leaving the hole 7 free to receive a valve stem. The leaf spring portion of lever 16 which terminates in the jaw 18 functions to return the jaw 18 to its normal or clamping position when the handle 17 is released.

The aforementioned elements, including the body 2, collar 6, valve depressor 12 and lever 16, comprise a conventional air chuck 1 which is well known in the art and commercially available as a unit substantially in the form shown and described herein.

Referring still particularly to FIG. 2, the present invention lies in the piston 20 interposed between the air chuck 1 and the conduit supplying pressurized air to the chuck and in the cylinder 30 surrounding the piston 20 and the valve aligning sleeve 40 attached thereto. The piston 20 is comprised of a cylindrical piston head section 21 and an integral coaxial cylindrical piston rod section 22 of lesser diameter depending therefrom. The piston head 21 is provided, in its face opposite to the rod 22, with a threaded cylindrical recess 23 by means of which the piston head 21 may be placed in threaded attachment to a pressurized air conduit. The opposite end of the rod 22 is provided with an external thread 24 designed to mate with the threaded bore 4 in the body 2, whereby the piston rod 22 may be attached to the air chuck 1. Passing axially completely through the piston head 21 and the rod 22 from the bottom face 23' of the recess 23 to the opposite end of the rod 22 is an air passage 25. Communicating with the air passage 25 and extending completely through the wall of the piston rod 22 immediately adjacent to the piston head 21 is a port 26, the function of which will be explained hereinafter.

Surrounding the piston 20 and mounted so as to be capable of being reciprocated in an axial direction with respect thereto is a cylinder 30 comprised of a cylinder body 31 provided with a first cylindrical bore of slightly larger diameter than the diameter of the piston head 21. The cylinder 30 is also provided with a cylinder head 33 which, in turn, is provided with a second cylindrical bore 34 passing therethrough, said second bore 34 being coaxial with said first bore 32 and having a smaller diameter than said first bore, the diameter of said second bore being slightly larger than the outside diameter of the piston rod 22. The cylinder head 33 is also provided with a cylindrical, externally threaded extension 35.

The piston 20 and the cylinder 30 together define an annular air chamber 38 bounded by the piston head 21, the piston rod 22, the cylinder head 33 and the cylinder wall 31. It is with this chamber 38 that the port 26 communicates to admit pressurized air to said chamber 38 from the air passage 25 whenever pressurized air is admitted to the chuck 1 for the purpose of inflating an inner tube. The chamber 38 is sealed at either end by the O-ring gaskets 27 and 36 mounted, respectively, in annular grooves 28 and 37 in the piston head 21 and the cylinder head 33.

Attached by means of mating internal threads 41 to the cylinder head extension 35 is the tubular valve aligning sleeve 40. The sleeve 40 surrounds the air chuck 1 and, when in its most extended position, with the cylinder head extension 35 abutting the body 2 of the air chuck 1, extends beyond the collar 6 of the air chuck 1 a distance substantially equal to the length of a valve stem less that portion of the total length of said valve stem insertable into the hole 7 and the thickness of a wheel rim. This distance A (FIG. 4) between the collar 6 and the rim 52 when a valve clamped in the chuck 1 is pulled tightly against the inside of the rim 52 will be referred to hereinafter as the "free length" of the valve stem. The sleeve 40 is provided, at its end most remote from the cylinder 30, with two slots 42 for visual and manual access to a valve stem gripped by the chuck 1. One of these slots 42 has the further function of providing a space for the collar extension 8 to extend through the sleeve 40.

Figure 3:
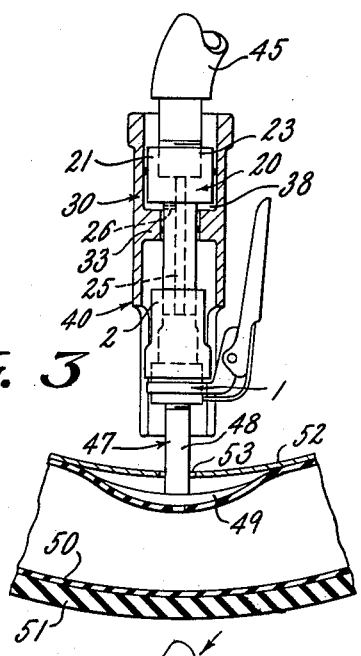
FIG. 3 is a partially sectioned view showing the device mounted on a valve stem of a tube prior to the introduction of pressurized air.
Figure 4:
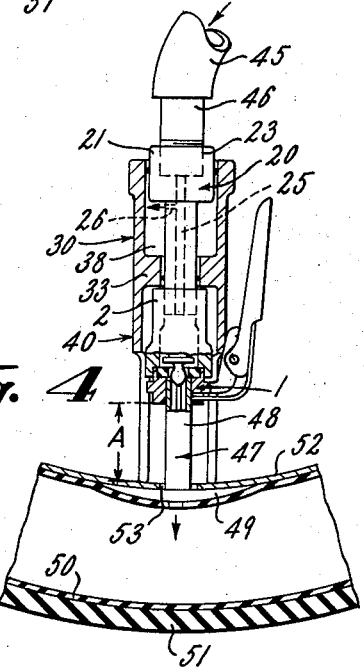
FIG. 4 is a view similar to FIG. 3 showing the device, rim, tube and casing with inflation pressure applied.

Referring now particularly to FIGS. 3 and 4, the device of this invention is shown attached to an air hose 45 by means of a nipple 46 threaded into the recess 23 in the piston head 21. In FIG. 3, the device is shown just after the end of a valve stem 48 of a valve 47 has been inserted into the chuck 1 and clamped therein. The inner tube 50, to which the base 49 of the valve 47 is bonded, is shown inserted in the casing 51 mounted on the rim 52. Because no pressurized air has yet been admitted to the chuck 1 or to the tube 50, the tube 50 is shown in a relaxed condition with the valve stem 48 protruding from the valve hole 53 in the rim 52 only part of its inflated free length. Similarly, the valve aligning sleeve 40 and cylinder 30 have been retracted away from the chuck 1 to facilitate the attachment of the chuck 1 to the valve stem 48 while manually holding the valve stem 48. The chamber 38 is, consequently, at or near its minimum volume, the piston head 21 and the cylinder head 33 being very nearly in contact with each other.

In FIG. 4, pressurized air has been admitted to the chuck 1 and the tube 50 by means of a valve (not shown) further upstream on the hose 45, and the tube 50 is being inflated. Simultaneously with the admission of pressurized air to the tube 50 through the hose 45, the nipple 46, the air passage 25 through the piston 20, the chuck 1 and the valve stem 48, air was also admitted from the air passage 25 into the chamber 38 through the port 26. The admission of pressurized air into the chamber 38 forces the cylinder head 33 away from the piston head 21 so that the chamber 38 will increase in length to its maximum volume with the cylinder head 33 seated against the chuck body 2. This movement of the cylinder head 30 causes the attached valve aligning sleeve 40 to extend over the chuck 1 and the valve stem 48 toward the rim 52. Since this action results in extending the sleeve 40 beyond the collar 6 a distance substantially equal to the free length A of the valve stem 48, the sleeve 40 forces the chuck 1 and the rim 52 apart drawing the entire free length A of the valve stem 48 through the valve hole 53 and seating the valve base 49 firmly and squarely (without cocking) against the inside of the rim 52. In this manner the valve 47 is held in proper alignment and position while the tube 50 is being inflated.

Having thus described our invention, what we claim and desire to protect by Letters Patent is:

1. In an apparatus for inflating, with pressurized air, an inner tube having a valve stem, said tube being mounted in a casing on a rim, the combination comprising:
    (a) an air chuck provided with means for clamping said chuck to said valve stem in air transfer relationship therewith, said chuck having an axis substantially coinciding with the longitudinal axis of said valve stem;
    (b) valve aligning and positioning means adjacent to said chuck and movable with respect thereto in a direction parallel to said axis; and
    (c) motor means for causing said valve aligning means to extend axially a predetermined distance beyond said chuck and over said valve stem while pressurized air is being admitted to said valve stem through said chuck;
    (d) whereby said valve stem is held in proper position and alignment with respect to said rim while said tube is being inflated.

2. The apparatus of claim 1, wherein the motor means (c) is actuated by the pressurized air being used to inflate the tube.

3. The apparatus of claim 1, wherein the motor means (c) comprises a pneumatic cylinder assembly driven from the pressurized air stream being used to inflate the tube.

4. The apparatus of claim 1, wherein the motor means (c) comprises a piston attached to the chuck (a), said piston being slideably mounted in a cylinder attached to the valve aligning means (b), a portion of the pressurized air for inflating the tube being divertable into said cylinder to cause relative movement of said cylinder and piston.

5. In an apparatus for inflating, with pressurized air, an inner tube having a valve stem, said tube being mounted in a casing on a rim, the combination comprising:
    (a) an air chuck provided with means for clamping said chuck to said valve stem in air transfer relationship therewith, said chuck having an axis substantially coinciding with the longitudinal axis of said valve stem;
    (b) tubular valve aligning and positioning means at least partially surrounding said chuck and movable with respect thereto in a direction parallel to the axis of said chuck; and
    (c) motor means, attached to said chuck and driven by a portion of the pressurized air being fed to said chuck, for causing said valve aligning means to extend axially a predetermined distance beyond said chuck and over said valve stem to bear against said rim while pressurized air is being admitted to said valve stem through said chuck;
    (d) whereby said valve stem is held in proper position and alignment with respect to said rim while said tube is being inflated.

6. The apparatus of claim 5, wherein the motor means (c) comprises piston means slideably mounted in cylinder means, one of said last mentioned means being attached to said chuck (a) and the other said last mentioned means being attached to said valve aligning means (b).

7. The apparatus of claim 5, wherein the motor means (c) comprises a piston attached to the chuck (a) slideably mounted in a cylinder having a head, said cylinder being attached to said valve aligning means (b).

8. In an apparatus for inflating, with pressurized air, an inner tube having a valve stem, said tube being mounted in a casing on a rim, the combination comprising:
    (a) an air chuck provided with means for clamping said chuck to said valve stem in air transfer relationship therewith, said chuck having an axis substantially coinciding with the longitudinal axis of said valve stem;
    (b) piston means fixedly attached to said chuck and having a passage therethrough for the admission of pressurized air to said chuck;
    (c) cylinder means having a head slideably mounted around said piston means in substantially air-tight relationship therewith;
    (d) said piston means and said cylinder means defining a chamber, the volume of which is variable as the cylinder means slides with respect to the piston means;
    (e) tubular valve aligning and positioning means at least partially surrounding said chuck and movable with respect thereto in a direction parallel to said axis of said chuck, said valve aligning means being fixedly attached to said cylinder means; and (f) a port for admitting pressurized air from said passage in said piston means into said chamber between said piston means and said cylinder means;

(g) whereby, when pressurized air is admitted to said chuck, a portion of said pressurized air will enter said chamber between said piston means and said cylinder means to move said cylinder means and said valve aligning means with respect to said piston means and said chuck causing said valve aligning means to extend axially a predetermined distance beyond said chuck and over said valve stem to bear against said rim while pressurized air is being admitted to said valve stem through said chuck.

9. The apparatus of claim 8, wherein the predetermined distance referred to in (g) is substantially equal to the free length of said valve stem.

References Cited in the file of this patent
UNITED STATES PATENTS

| | | |
|---|---|---|
| 1,854,797 | Kirkpatrick | Apr. 19, 1932 |
| 2,652,965 | McGihon | Sept. 22, 1953 |
| 2,787,253 | Boothe | Apr. 2, 1957 |